United States Patent [19]

Dussartre

[11] 3,999,436
[45] Dec. 28, 1976

[54] DEVICE FOR COMPENSATING FOR EXPANSIONS AND THE THERMO-ELASTIC COEFFICIENT OF AN ANEROID CAPSULE

[75] Inventor: Roger Dussartre, Versailles, France
[73] Assignee: JAEGER, Levallois-Perret, France
[22] Filed: Mar. 19, 1976
[21] Appl. No.: 668,736
[30] Foreign Application Priority Data
    Apr. 17, 1975    France ............................ 75.11955
[52] U.S. Cl. .................................................. 73/393
[51] Int. Cl.² ......................................... G01L 19/04
[58] Field of Search ............ 73/393, 386, 387, 410, 73/406, 398 AR
[56] References Cited
    UNITED STATES PATENTS
    3,040,582    6/1962    Lorenz ................. 73/393

3,608,378    9/1971    Sowinski ............................ 73/393

*Primary Examiner*—Donald O. Woodiel

[57] ABSTRACT

A device for compensating for variations caused by temperature variations, in the reading of a measuring apparatus comprising an aneroid capsule associated with a mechanical system comprising a connecting rod and crank pin. A bimetallic strip is arranged perpendicularly to the plane of the connecting rod and crank pin is of square section with two cylindrical ends, whereof one is engaged in an attachment pivot of the connecting rod and the other is mounted in a housing clamp integral with a support arranged parallel to the bimetallic strip and whereof the other end is fixed to the crank pin.

3 Claims, 4 Drawing Figures

DEVICE FOR COMPENSATING FOR EXPANSIONS AND THE THERMO-ELASTIC COEFFICIENT OF AN ANEROID CAPSULE

The present invention relates to measuring instruments using information provided by an aneroid capsule associated with a mechanical system comprising a connecting rod and crank pin and more particularly, a device making it possible to compensate for variations of the instrument caused by temperature variations.

Figure 1:
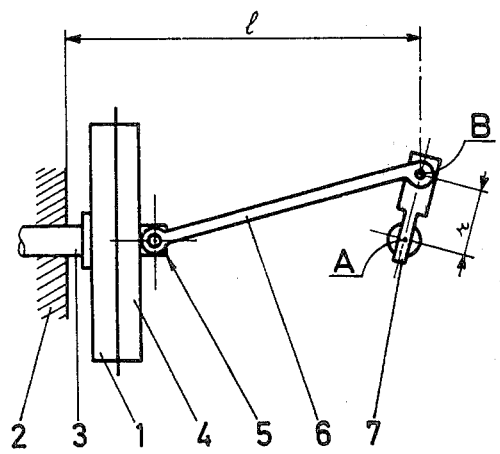

In an arrangement, such as illustrated in FIG. 1, comprising an aneroid capsule composed of two diaphragms: a diaphragm 1 fixed to a frame 2 by appropriate means 3 and an active diaphragm 4 connected by a cotter pin 5 to a system composed of a connecting rod 6 and a crank pin 7, capable of transforming the longitudinal movement of the active diaphragm into a rotation of predetermined law. When the device is subject to temperature variations, the latter cause changes in the various component parts, consequently causing variations in the instrument reading. These variations may be broken down into two separate effects:

— a variation in the reading of the instrument at rest, so-called "fixed point variation", i.e. the variation of the dimension 1, due to the projection along 1 of the expansion of the frame 2, of the connecting rod 6, of the crank pin 7 and to the variation of the dimensions of the empty capsule, by variation of its thermo-elastic coefficient — a variation of the angle covered by the system of the connecting rod 6/crank pin 7 for a given pressure difference to be measured. This variation, termed the "amplification variation" is due to the modification of the length $r$ of the crank pin 7 and to the variation of the travel of the diaphragm 4 of the aneroid capsule, due to the modification of its thermo-elastic coefficient.

Conventionally, these variations are corrected by the addition of two bimetallic strips, whose deflections are directed respectively along $l$ and $r$ in the opposite direction to the variations caused by the temperature variations.

According to the invention, these two corrections are carried out by using only one bimetallic strip placed perpendicularly to the plane of the connecting rod and crank pin, of square section and having two cylindrical ends, whereof one is engaged in an attachment pivot of the connecting rod and the other is mounted in a housing clamp integral with the end of a lever arm arranged parallel to the bimetallic strip and whereof the other end is pivoted on the crank pin.

Figure 3:
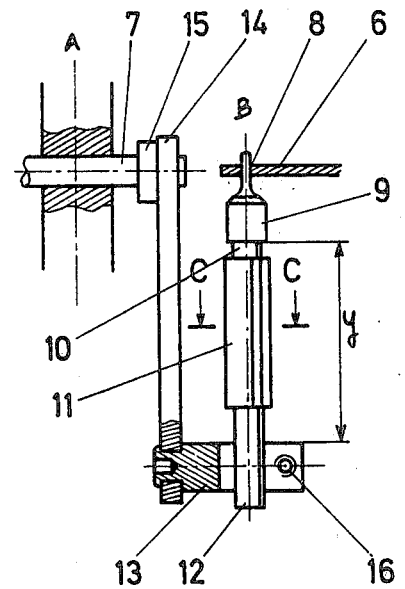
Figure 2:
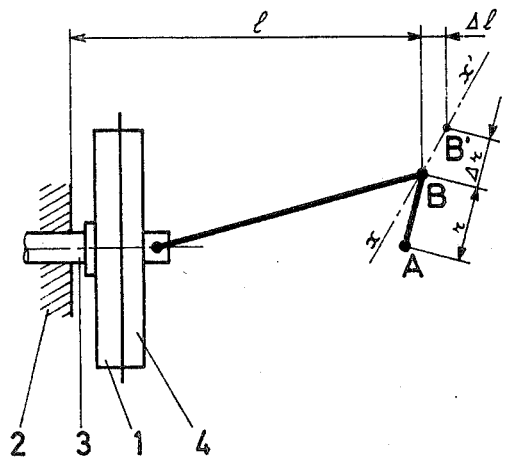
Figure 4:
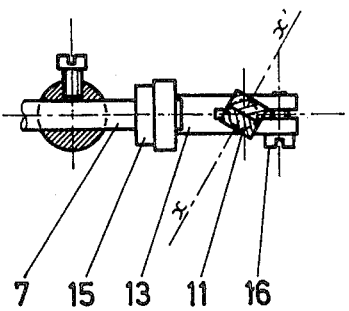

As an example, the accompanying figures illustrate one embodiment according to the invention:

FIG. 1 shows the device before correction,
FIG. 2 illustrates the action of the bimetallic strip,
FIG. 3 shows the assembly of the bimetallic strip,
FIG. 4 is a cross section on line C—C, of the device.

Provided in the connecting rod 6 (FIG. 3) is an aperture 8, into which is introduced the end of a pivot 9, in the other end of which is engaged the cylindrical end 10 of a bimetallic strip 11 of square section. The second cylindrical end 12 of the bimetallic strip 11 slides in a housing clamp 13, which is integral with a support 14, arranged parallel to the bimetallic strip and secured by appropriate means 15 to the crank pin 7. The connecting rod 6 and crank pin 7 are arranged in the same alignment, perpendicular to the arm of the lever 14 and to the bimetallic strip 11. A screw 16, mounted at the end of the housing clamp 13 enables clamping of the latter and consequently adjustment of the active length $y$ and orientation of the bimetallic strip 11.

The operation of the device is as follows (FIG. 2). The bimetallic strip 11 is initially located at the point B. Under the influence of temperature, it deflects, along the axis $x\ x'$, and reaches B'. The direction $x\ x'$ is chosen (FIG. 4) at the time of regulation, such that the deflection B B' is divided in the direction of the variations $l$ and $r$, giving the desired values $\Delta l$ and $\Delta r$ (FIG. 2) in combination with the coefficient of expansion of the bimetallic strip and the active length $y$.

What is claimed is:
1. A device for compensating for variations, caused by temperature variations, in the reading of a measuring apparatus, the device comprising an aneroid capsule, a mechanical system comprising a connecting rod and crank pin associated with the capsule, a bimetallic strip of square section with two cylindrical ends arranged perpendicularly to the plane of the connecting rod and crank pin, one strip end being engaged in an attachment pivot of the connecting rod and the other being mounted in a housing clamp integral with the end of a support, arranged parallel to the bimetallic strip, and whereof the other end is fixed to the crank pin.

2. A device according to claim 1, in which the axis of deflection of the bimetallic strip is selected in combination with its coefficient of expansion and its active length, such that, corresponding to a given temperature, variation is a value and direction of said deflection, whereof the projections along the axes of the deformations, are equal and whose signs are opposed to the latter.

3. A device according to claim 2, in which the housing clamp is adjustable.

* * * * *